March 9, 1948.  J. HORNBOSTEL  2,437,428
ELECTRIC MOTOR SYSTEM AND METHOD OF CONTROLLING THE SAME
Filed May 19, 1943
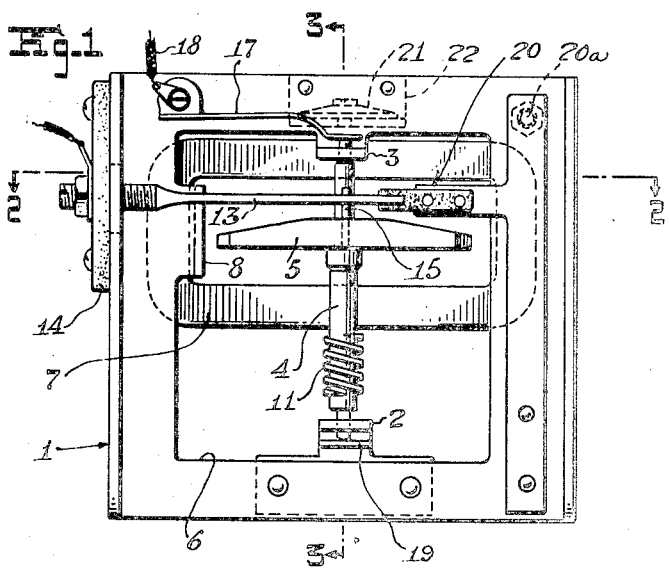
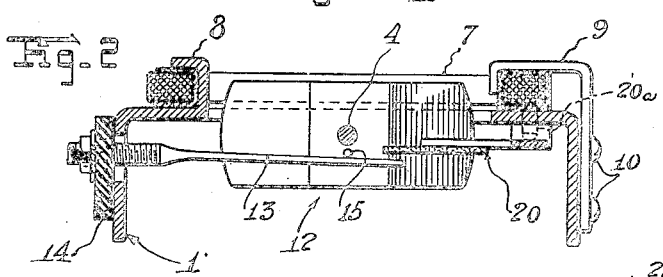
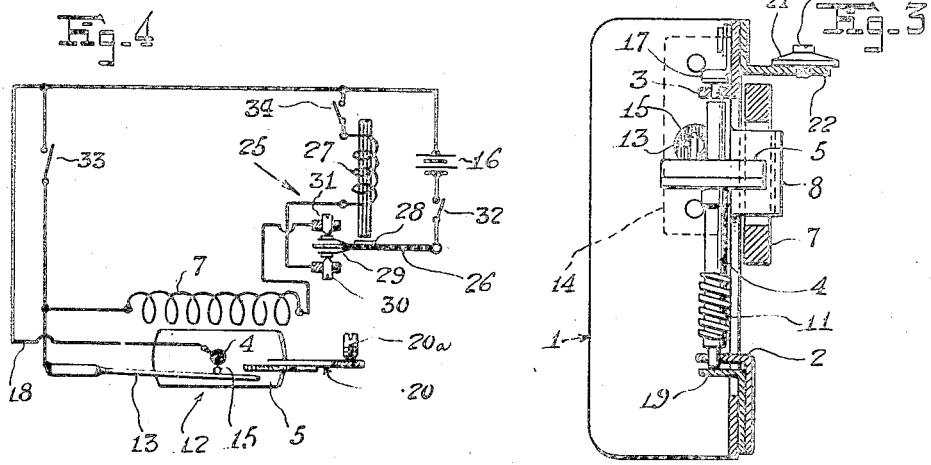
Inventor
John Hornbostel
By Henry Lanahan
Attorney Patented Mar. 9, 1948

2,437,428

UNITED STATES PATENT OFFICE 2,437,428

ELECTRIC MOTOR SYSTEM AND METHOD OF CONTROLLING THE SAME

John Hornbostel, Glen Ridge, N. J., assignor to Thomas A. Edison, Incorporated, West Orange, N. J., a corporation of New Jersey Application May 19, 1943, Serial No. 487,829

10 Claims. (Cl. 318—330)

This invention relates to electric motor systems and more particularly to an improved system for producing mechanical movement at constant speed by D.-C. electric power.

My invention is particularly suited as a drive means for D.-C. operated instruments which require highly constant drive speed. An example of such an instrument is a radiosonde of the chronometric type. This instrument is operated necessarily by a battery and requires a very light motor system of rugged construction which will operate with small power consumption and at substantially constant speed. The present invention is adapted to serve efficiently and dependably as a drive means for such an instrument, but it will of course be understood that I intend no limitation of my invention to this application.

It is an object of my invention to provide a motor system of the type abovementioned which comprises a novel and improved combination of elements.

It is another object to provide a new and improved method for starting such motor system and maintaining the same running at a predetermined speed.

Other objects of my invention are to provide an efficient motor system of the type abovementioned which is capable of running continuously for long periods from a small power source such as a battery, which will maintain its speed at a substantially constant value under a wide range of variation in supply voltage, and which is light in weight but simple and rugged in its construction.

These and other objects of my invention will more fully appear from the following description and the appended claims.

In the description of my invention reference is had to the accompanying drawings, of which:

Figure 1 is an elevational view of the motor per se of my invention;

Figure 2 is a horizontal sectional view taken on the line 2—2 of Figure 1;

Figure 3 is a vertical sectional view taken on the line 3—3 of Figure 1; and

Figure 4 is a schematic view showing circuits and mechanism of the present motor system.

The motor of the present system, herein generally referred to as M, has a channel frame 1 onto the back side of which there are provided vertically spaced bearings 2 and 3. Journalled into these bearings is a shaft 4 for the rotor of the motor. This rotor comprises a permanent magnet 5 made of a highly efficient and coercive magnetic material such as that known commercially as "Alnico." The magnet may be generally bar-shaped as viewed from the top, but for reduced rotational inertia and better weight efficiency it is preferably bevelled to have a decreasing thickness toward the ends, as is shown in Figure 1. The axis of the rotor is set in slightly from the back wall of the frame, and the frame has a large central aperture 6 through which the magnet passes in its rotating movement. Mounted on the back side of the back wall of the frame is a rectangular air-cored coil 7. This coil has its medial plane parallel to but preferably set off from the rotational axis of the rotor as is shown in Figure 2, the magnet passing through the coil as it turns on its axis. The coil is held in place by a lug 8 turned back from the back wall of the frame and by a clamping member 9 secured to the frame by screws 10. Mechanical power may be taken from the rotor by way of a worm gear 11 on the shaft 4.

The motor includes an interrupter 12 in series with its field coil which comprises a spring 13, which is mounted insulatedly onto a Bakelite plate 14 carried by the left wall of the frame, and a contact pin 15 that is carried by and electrically connected to the rotor magnet 5. Electric power for the motor is supplied by a battery 16, the supply circuit from the battery to the motor being completed by way of the motor shaft 4, a spring 17 which electrically connects the shaft to the frame 1, and a lead 18 which connects the frame to one side of the battery. Preferably the spring 17 is mounted to press against one end of the shaft 4, the weight of the rotor system and the thrust exerted thereon by the spring 17 being taken up by a thrust bearing 19 at the bottom of the shaft. The pin 15 contacts the spring 13 of the interrupter 12 during a minor fraction of each revolution, and the spring 13 rests against an adjustable spring-mounted stop 20 of insulating material during the rest of each revolution, the particular fraction of each revolution in which the interrupter is closed being controlled by adjusting screw 20a for the stop. As a typical case, the stop 20 is set to cause the interrupter 12 to close during one-quarter of each revolution. This one-quarter is selected to occur when the field coil has its most efficient torque influence (in one direction) on the magnet, this being the range in which the magnet axis is plus and minus approximately 45° from a position of parallelism with the medial plane of the coil.

During standstill the rotor magnet 5 is held parallel to the medial plane of the field coil by a stationary permanent magnet 21. This magnet is suitably mounted above the field coil onto a bracket 22, and is held thereto by a screw 23, the magnet being so mounted that it may be adjusted angularly about an axis parallel to the rotational axis of the rotor magnet. When the magnet 21 is adjusted to hold the rotor magnet during standstill in a position wherein the magnetic axis of the rotor magnet is substantially parallel to the medial plane of the field coil, the field coil will have a maximum torque influence on the rotor and self-starting of the motor is assured.

In the present motor system the running speed of the motor is established and held highly constant by a vibrator 25, diagrammatically shown in Figure 4, which itself interrupts the field circuit of the motor at a fixed predetermined frequency. The vibrator comprises a tuned reed 26 and a field coil 27, there being a suitable armature on the reed, diagrammatically shown and referred to as 28, by which the field coil magnetically attracts the reed when the coil is energized. The reed carries a pair of spring-mounted contacts 29 which make and break alternately with a pair of adjustable contacts 30 and 31, the reed touching both of these contacts however on standstill. The circuit of the vibrator coil is completed with the battery 16 by way of the reed and one of these fixed contacts, and the field circuit of the motor is completed by way of the reed and the other of these fixed contacts. In each of these circuits, however, there is serially included the on-off switch 32.

On closing the switch 32 the reed is set immediately into vibration at its natural tuned frequency. This frequency—which may typically be 33 cycles per second—the reed is adapted to maintain with high accuracy. As the reed vibrates, the contacts 29 and 30 make and break alternately to interrupt the supply of direct current from the battery 16 to the motor. At the instant the switch 32 is closed, the rotor magnet is at standstill in a position for maximum torque influence thereon by the field coil, and the motor interrupter 12 is closed, as is above explained. The current impulses from the vibrator accordingly flow immediately through the field coil and set up torque impulses on the rotor magnet to start rotation of the motor. The torque impulses are limited by the motor interrupter 12 to approximately that quarter of each revolution of the rotor wherein the impulses are not only strongest but are also all in one direction, and the motor accordingly rapidly picks up speed.

As the motor gains speed, the number of interruptions in the field current during each period of closure of the motor interrupter 12 become less and less, but these periods occur more and more frequently and the motor receives power at about the same rate. It may here be noted that each contact-make of the vibrator lasts during substantially one-half of each cycle of the vibrator, the proper duration being established by adjustment of contact 31. When the motor reaches a speed wherein the frequency of its own interruptions is the same as those of the vibrator—this speed being hereinafter termed the synchronous speed of the motor—the vibrator contacts 29 and 31 in the field circuit close for periods approximately twice as long as does the motor interrupter 12 (in view of the interrupter closing for only one-quarter of each revolution as has been explained); the vibrator can therefore either close or open the field circuit during the whole of each closure period of the motor interrupter, depending on the phase relationship between the vibrator and the motor. Actually, when the motor reaches synchronous speed its speed becomes stabilized in a phase relationship with the vibrator wherein the closure periods of the vibrator and motor interrupter partly coincide, the end of each closure period of the motor interrupter overlapping the beginning of each closure period of the vibrator, the amount of overlapping depending on the amount of mechanical load imposed on the motor. The operation by which the motor speed is so stabilized is as follows: Once the motor reaches synchronous speed any influence causing it momentarily to lose speed will cause the closure periods of the interrupter to overlap the closure periods of the vibrator to a greater extent. This causes the field current to increase and the motor to gain speed and restore itself to synchronism with the vibrator. On the other hand, an influence which causes the motor momentarily to increase above synchronous speed will cause the closure periods of the interrupter to overlap the closure periods of the vibrator to a lesser extent. This has the effect of reducing the field current and causes the motor to lose speed and be restored to synchronism with the vibrator. Thus, the motor tends to maintain a fixed speed with the same accuracy with which the vibrator maintains its fixed tuned frequency of vibration.

As is typical, however, with synchronous systems, the motor will tend to hunt—that is, shift in phase more or less recurrently—with respect to the vibrator. I have found, however, that this hunting tendency is very greatly mitigated by shorting out the interrupter 12 once the motor has reached synchronous speed. This shorting is done by means of a switch 33 connected across the interrupter as is shown in Figure 4. The effect of shorting out the motor interrupter 12 is twofold: it fixes the excitation periods of the field coil to the duration of approximately one-half of each revolution of the motor instead of leaving the excitation periods variable and for the duration of only a fraction of one-quarter of each revolution, and it permits the field coil to exert torque in either direction on the rotor depending on the phase relationship between the motor and the vibrator. For instance, a given current in the field coil will produce forward driving torque on the rotor in the 180° range of movement of the rotor magnet from a position of axial alignment with the field coil at one polarity to alignment with the coil at the other polarity, and will produce a reverse driving torque on the rotor in the remaining 180° range of one revolution of the rotor. Between these two ranges the torque gradient is very steep for it changes wholly from one direction to the other upon a 180° shift in phase of the rotor relative to the vibrator. As a result, when the interrupter 12 is shorted out, the motor is snapped into a phase relationship with the vibrator wherein, during each interval of closure of the field circuit by the vibrator, there are produced successively both forward and reverse driving torques on the rotor but with the forward driving torque exceeding the reverse driving torque to produce sufficient resultant torque to maintain the motor at synchronous speed. The motor becomes thus firmly locked in synchronism with the vibrator, and exhibits little hunting, because as soon as the motor shifts from a phase relationship wherein the net driving torque is in balance with the mechanical load, the driving torque changes sharply to restore the motor to that phase relationship.

In the operation of my invention as hereinabove described, the vibrator receives power and is set into operation immediately on closing the switch 32 to start the motor. In so starting the vibrator and motor simultaneously the starting procedure for the motor system is simplified; on the other hand, the torque impulses which are exerted on the rotor during the fraction of each revolution in which the motor interrupter is closed are themselves interrupted by the vibrator and the resultant torque for starting the motor is reduced. In applications where a high starting torque is desired, it is advantageous first to supply power to the motor only, while leaving the vibrator in an idle state, and thereafter starting the vibrator when the motor has at least gained its running speed. The vibrator is left idle as the motor is started by opening its field circuit by means of a switch 34 shown in Figure 4. In so leaving the vibrator in idle condition the motor receives steady torque impulses during each revolution and its starting is very rapid. There is, however, no limit put on the motor speed, other than one of mechanical load, and the motor will accordingly attain a higher-than-normal speed. When the motor reaches such higher speed the vibrator is then put into operation by closing switch 34. This has the effect of lowering the motor speed to synchronism with the vibrator, which it does very quickly and positively. Thereafter, as has been above described, the motor interrupter 12 is shorted out by means of the switch 33 so as to firmly lock the motor into synchronism with the vibrator and reduce hunting.

The embodiment of my invention herein shown and described is intended to be illustrative and not necessarily limitative of my invention, since the same may be changed and modified without departing from the scope of my invention, which I endeavor to express according to the following claims.

I claim:

1. In a motor system including a field coil and a rotor: the combination of a field circuit for connecting said coil to a source of electric power; a first circuit interrupter serially included in said field circuit and operated according to the positioning of said rotor; and a second circuit interrupter also serially included in said field circuit and time-controlled to operate at a predetermined frequency.

2. In a motor system including a field coil circuit and a rotor: the combination of a circuit interrupter in said field circuit controlled by said rotor to operate in fixed timed relationship with the speed of rotation of the rotor; and a second circuit interrupter also in said field circuit controlled independently of said rotor to operate at a fixed predetermined frequency.

3. In a motor system including a field coil, a permanent magnet rotor and a source of D.-C. electric power for said coil: the combination of a circuit for connecting said coil to said power source; means operated by said rotor for interrupting said circuit; a second interrupting means included in said circuit; and a tuned vibrator for operating said second interrupting means at a fixed predetermined frequency.

4. In a motor system including a field coil and a rotor actuatable by a magnetic field produced by said coil: the combination of a circuit interrupter in series with said coil and operated in fixed timed relationship with the speed of rotation of said rotor; and a second circuit interrupter in series with said field coil and operated at a predetermined frequency to establish the running speed of the motor at a predetermined value, one of said interrupters having a substantially greater closure period than the other when the running speed is at said predetermined value.

5. In a motor system adapted to be operated by D.-C. electric power and including a field coil and a permanent magnet rotor: the combination of a circuit interrupter in series with said field coil and operated to close during a minor fraction of each revolution of said rotor in which said coil has a unidirectional torque influence on said rotor; and a second circuit interrupter in series with said field coil and adapted to operate at a substantially fixed frequency, said second interrupter having substantially equal closure and open periods.

6. In a motor system comprising a field coil circuit and a rotor: the combination of a first interrupter in said circuit controlled by said rotor; a second interrupter in said circuit independently controlled to operate at a fixed predetermined frequency; and means independent of said second interrupter for effectively removing said first interrupter from said circuit.

7. The method of controlling a D.-C. magnetic field to start and maintain a permanent magnet rotor running at a predetermined speed, which comprises interrupting said field according to the positioning of the rotor to start rotation of the rotor, and simultaneously interrupting said field at a predetermined frequency to establish the running speed of the rotor at a predetermined value.

8. The method of controlling a motor unit having a field coil circuit and a permanent magnet rotor, which comprises supplying direct current to said circuit, interrupting said circuit in fixed relation to the positioning of the rotor whereby to start the motor running, simultaneously interrupting the supply of direct current to said circuit at a fixed predetermined frequency to establish the running speed of the motor at a predetermined value, and discontinuing the interrupting of the field circuit according to the rotor positioning after the rotor reaches said predetermined speed.

9. In a motor system comprising a field coil circuit and a rotor: the combination of a first interrupter in said circuit controlled by said rotor; a second interrupter in said circuit independently controlled to operate at a fixed predetermined frequency; and switch means operable to effectively remove said first interrupter from said circuit without disturbing the operation of said second interrupter.

10. The method of controlling a motor unit having a field coil circuit and a permanent magnet rotor, which comprises supplying direct current to said circuit, interrupting said circuit in fixed relation to the positioning of the rotor whereby to start the motor running, interrupting the supply of direct current to said circuit at a fixed predetermined frequency when said motor has attained a substantial running speed, and thereafter discontinuing the interrupting of the field circuit according to the rotor positioning.

JOHN HORNBOSTEL.

REFERENCES CITED

The following references are of record in the file of this patent:

UNITED STATES PATENTS

| Number | Name | Date |
|---|---|---|
| 1,533,211 | Rainey et al. | Apr. 14, 1925 |
| 1,937,739 | Woodward et al. | Dec. 5, 1933 |
| 1,284,219 | Benjamin | Nov. 12, 1918 |
| 1,625,314 | Gruenwald | Apr. 19, 1927 |
| 1,077,179 | Wilson | Oct. 28, 1913 |
| 1,723,084 | Sibley | Aug. 6, 1929 |
| 2,181,841 | Wallace | Nov. 28, 1939 |
| 2,233,933 | Anderson | Mar. 4, 1941 |
| 2,266,037 | Henninger et al. | Dec. 16, 1941 |